April 2, 1963 G. W. DALDER 3,083,722
SERVO VALVE
Filed Oct. 10, 1960
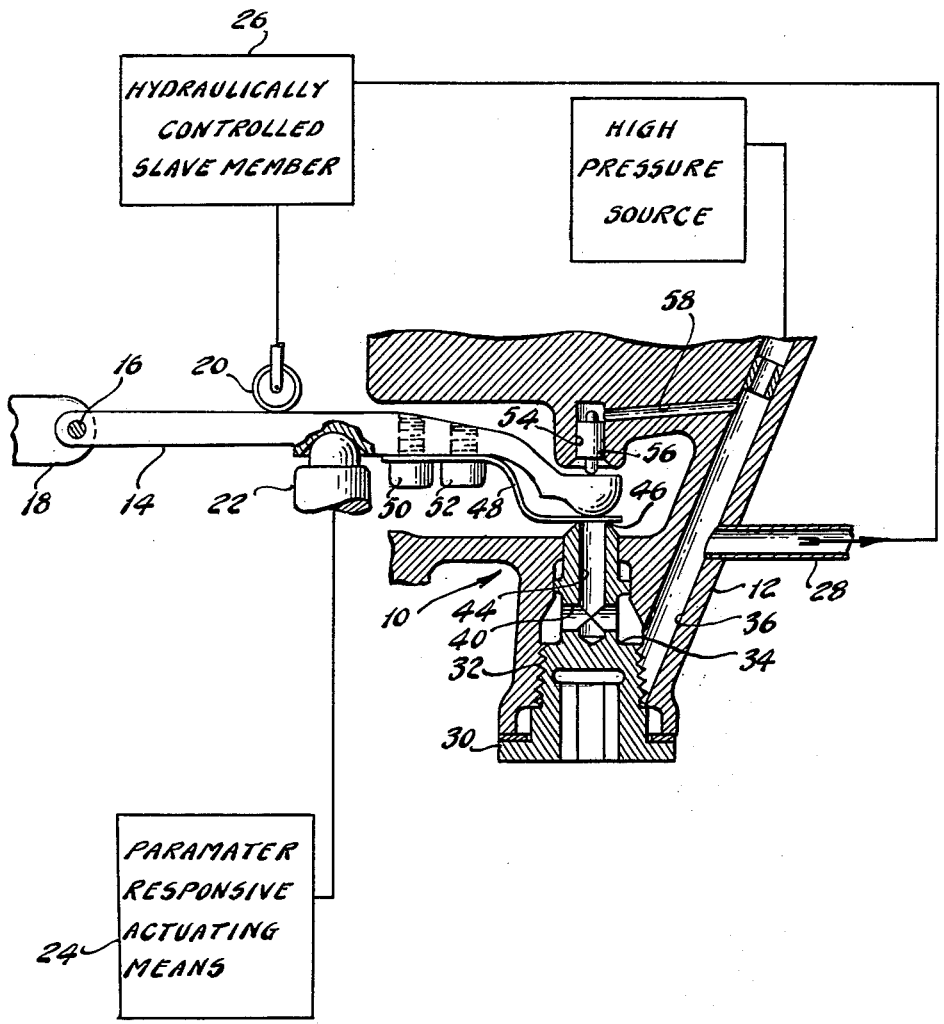
INVENTOR.
GERALD W. DALDER
BY Whittemore
Hulbert & Belknap
ATTORNEYS United States Patent Office 3,083,722
Patented Apr. 2, 1963

3,083,722
SERVO VALVE
Gerald W. Dalder, Royal Oak, Mich., assignor to Holley Carburetor Company, Warren, Mich., a corporation of Michigan
Filed Oct. 10, 1960, Ser. No. 61,470
1 Claim. (Cl. 137—82)

The invention relates to valves and refers more specifically to a self-aligning leaf spring poppet valve for use with a servo lever.

In the past fixed position poppet valves have sometimes been used with pivoted servo levers. However, the fixed poppet valves have the disadvantage of being fully closed in only one position thereof. Self-aligning poppet valves have previously been used to compensate for misalignments of parts and varying valve seat positions. Many of the self-aligning poppet valves of the past have however had a tendency to oscillate or flutter between relative positions thereof under operating conditions.

It is therefore one of the objects of the present invention to provide a self-aligning poppet valve which is not subject to flutter.

Another object is to provide a leaf spring poppet valve having self-aligning properties.

Another object is to provide a poppet valve for use in conjunction with a pivotally mounted servo lever, which poppet valve is not subject to flutter and which is self-aligning.

Another object is to provide a pivotally mounted servo lever responsive to a force applied along the length thereof due to a variable external parameter and an oppositely acting force due to contact therewith of a hydraulically controlled slave member also applied along the length thereof, and a self-centering leaf spring poppet valve secured to the servo lever operable to regulate the hydraulic pressure applied to the hydraulically controlled slave member in accordance with variations in the force applied to the servo lever due to the variable external parameter.

Another object is to provide a leaf spring self-aligning poppet valve in conjunction with a servo lever as set forth above wherein the poppet valve is secured to the free end of the servo lever in a position over a valve seat therefor and the servo lever is provided with a spherical end tangent to the poppet valve substantially centrally of the seat therefor.

Another object is to provide a poppet valve as set forth above which is simple in structure, economical to manufacture, and efficient in use.

Other objects and features of the invention will become apparent as the description proceeds, especially when taken in conjunction with the accompanying drawings, illustrating a preferred embodiment of the invention, wherein:

The FIGURE is a partially diagrammatic and partially block diagram illustration of a poppet valve in accordance with the invention mounted on a servo lever in a force balance system.

With particular reference to the drawing, one embodiment of the present invention will now be disclosed.

As shown in the figure, the poppet valve 10 of the invention is operable within a housing 12 in accordance with the position of the servo lever 14. As shown the servo lever 14 is pivotally mounted by pin 16 to a fixed support 18 and is adapted to be pivoted in the plane of the drawing by opposing forces applied thereto through members 20 and 22 respectively. The opposing forces vary in accordance with the magnitude of the parameter sensed by parameter responsive actuating means 24 and the position of the hydraulically controlled slave member 26. The positon of the hydraulically controlled slave member is determined by the pressure applied thereto through conduit 28 and therefore varies in accordance with the opening and closing of the poppet valve 10.

Thus, briefly considering the force balance system indicated in the figure, with the hydraulic slave member 26 in a predetermined position axially of the servo lever 14 so that the poppet valve 10 is closed, and with the parameter sensed by the parameter responsive actuating means 24 at a particular value, it will be understood that with an increase in parameter value the servo lever 14 will rotate counter-clockwise as shown in the figure to open the poppet valve 10. Opening of the poppet valve 10 produces a change in the hydraulic fluid pressure controlling the position of the slave member 26 so that the slave member is caused to move to a position whereby the force applied to the servo lever 14 by member 20 carried by the slave member due to the position of the slave member axially of the servo lever 14 will cause the servo lever 14 to rotate in a clockwise manner to close the poppet valve 10 in opposition to the increased force applied to the servo lever 14 by means 22. In this manner linear displacement of the hydraulically controlled slave member proportional to the parameter change sensed by the parameter responsive actuating means 24 is produced.

More specifically referring to the poppet valve 10, it will be noted that the valve includes the body member 30 adapted to be fastened within the housing 12 by means of the threads 32. The body member 30 is provided with an annular channel 34 therearound which is in communication with the restricted pasage 36 in the housing 12. The body member 30 of the poppet valve 10 is further provided with a transverse passage 40 therethrough in communication with the annular recess 34. In addition an axial passage 44 is provided in the body member 30 which terminates in poppet valve seat 46. Thus the poppet valve body member provides means for passing hydraulic fluid from a high pressure fluid source to the valve seat for the leaf spring poppet valve member 48.

The leaf spring poppet valve member 48, as shown in the drawing, is secured to the end of the servo lever 14 by convenient means such as screws 50 and 52. The leaf spring poppet valve member 48 is offset from the end of the servo lever 14 as shown and is adapted to be seated on the valve seat 46 of the body member 30 when the forces applied to the servo lever 14 are such that the servo lever 14 is in equilibrium after counterclockwise movement thereof.

The end of the servo lever 14 to which the poppet valve member 48 is secured is provided with an offset portion having a spherical end thereon which is tangent to the poppet valve member 48 centrally of the passage 44.

Piston 54 is operable in the passage 56 which is connected to the passage 36 through passage 58 to equalize the pressures on the poppet valve 10 so that movement of the valve member 48 is due solely to the forces applied to the servo arm 14 by the slave member 26 and the parameter responsive actuating means 24.

Thus in operation when servo lever 14 is moved in a counter-clockwise direction due to an increase in the parameter sensed, the poppet valve member 48 will move away from the valve seat 46 to permit hydraulic fluid to pass through the body member 30 from passage 36 and thereby reduce the hydraulic pressure in the passage 28. The servo lever 14 is subsequently rotated clockwise in response to movement of the hydraulically controlled slave member due to the lowered pressure in passage 28. The valve member 48 will contact the annular valve seat 46 at some position around the circumference thereof on clockwise movement of the servo lever. On continued clockwise movement of the servo lever 14 after initial contact of the valve member with the valve seat, the valve member 48, being of flexible spring material, will flex due to the bending movement applied thereto between the first contacted surface of the valve seat 46 and the point of tangency therewith of the spherical end of the servo lever 14. The valve member 48 is thus caused to be self-aligning and to positively seat on the valve seat 46 at all points around the circumference thereof without oscillation or fluttering.

The drawings and the foregoing specification constitute a description of the improved poppet valve of the invention in such full, clear, concise and exact terms as to enable any person skilled in the art to practice the invention, the scope of which is indicated by the appended claim.

What I claim as my invention is:

A self aligning poppet valve comprising an annular valve seat defining a circular valve orifice, a lever having a hemispherical portion at one end convex toward the circular valve orifice, centered thereover and having a diameter larger than that of the valve orifice, means pivotally mounting the other end of the lever for arcuate movement of the hemispherical end portion of the lever toward and away from the circular valve orifice and a resilient valve member having flat substantially parallel ends offset from each other one of which is rigdly secured to the lever in spaced relation to the hemispherical end thereof, the other end of the resilient valve member tangentially engaging the hemispherical end portion of the lever between the circular valve orifice and the hemispherical end portion of the lever, said other end of said valve member extending substantially parallel to the plane of the circular valve orifice with the lever in a plane substantially parallel to the plane of said circular valve orifice and being elastically deformable for conforming to the annular valve seat under pressure from the hemispherical end portion of the lever whereby said other end of the resilient valve member tightly closes the valve orifice on movement of the lever toward the valve orifice.

References Cited in the file of this patent

UNITED STATES PATENTS 2,907,338     Watrous _____ Oct. 6, 1959

FOREIGN PATENTS 197,683     Great Britain _____ May 15, 1924
719,275     Great Britain _____ Dec. 1, 1954
211,058     Australia _____ Apr. 26, 1956